March 17, 1936.   L. P. KALB ET AL   2,034,397
ENGINE
Filed April 13, 1932   2 Sheets-Sheet 1

INVENTORS
Harold H. Timian
Lewis P. Kalb
BY
ATTORNEY.

March 17, 1936.  L. P. KALB ET AL  2,034,397
ENGINE
Filed April 13, 1932  2 Sheets-Sheet 2
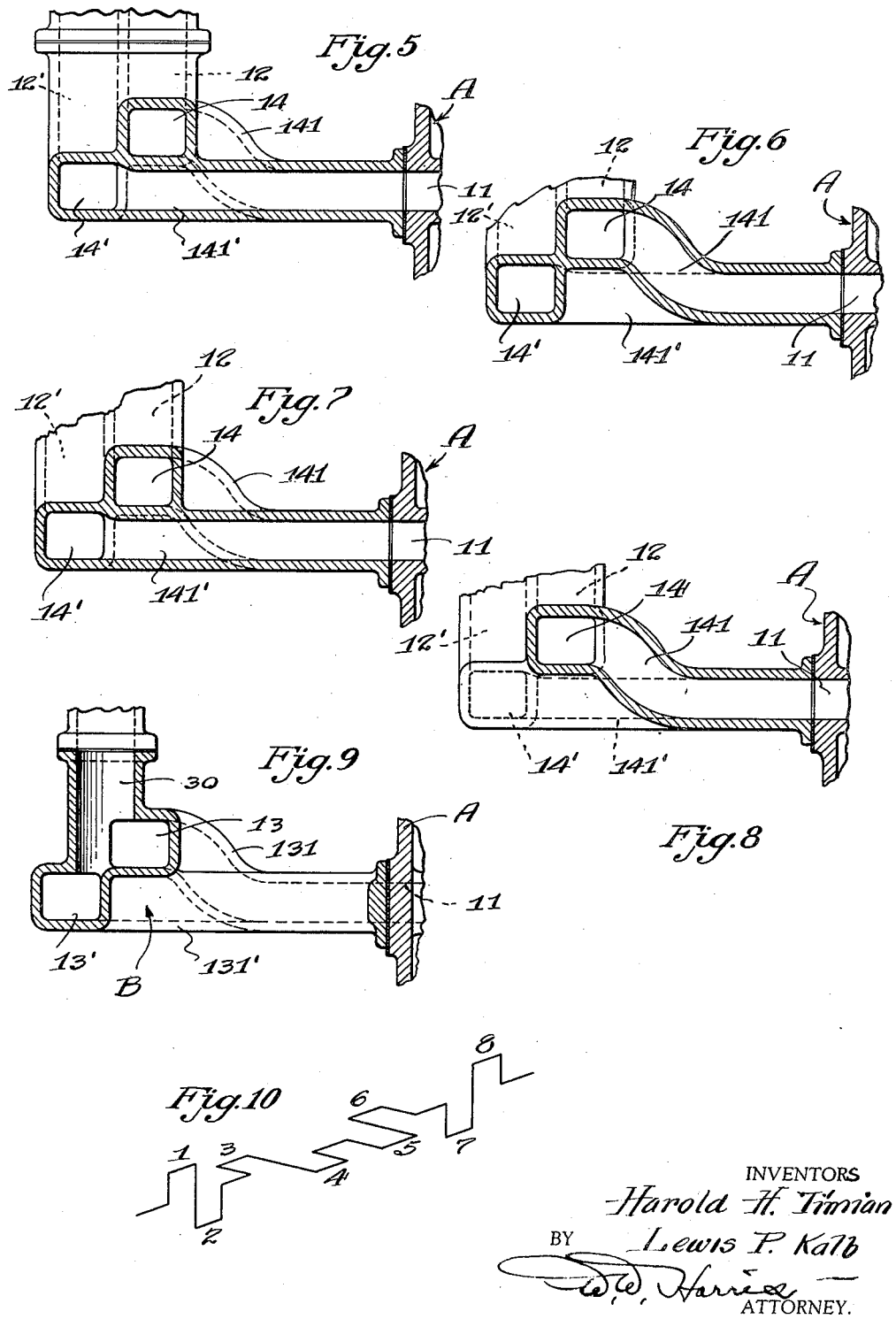
INVENTORS
Harold H. Timian
Lewis P. Kalb
BY
ATTORNEY.

Patented Mar. 17, 1936

2,034,397

UNITED STATES PATENT OFFICE 2,034,397

ENGINE

Lewis P. Kalb, Grosse Pointe Village, and Harold H. Timian, Detroit, Mich., assignors to Continental Motors Corporation, Detroit, Mich., a corporation of Virginia Application April 13, 1932, Serial No. 605,018

16 Claims. (Cl. 123—52)

Our invention relates to engines and more particularly to an intake manifold structure for distributing and conducting fuel mixture to a plurality of cylinders of an internal combustion engine.

With the introduction of multi-cylinder engines of the type employing six, eight, twelve or sixteen cylinders, much difficulty has been experienced in uniformly distributing the fuel mixture to the engine cylinders, particularly with those engines employing eight cylinders. It has been found preferable to provide individual port runners for each cylinder, these port runners being connected to lateral runners or branches in pairs, thereby necessitating the use of four of such branches in the case of an eight cylinder engine. With engines of the aforesaid type, and in particular the eight cylinder type, it has been proposed to connect a pair of engine cylinders to a branch or lateral runner and so construct the engine crankshaft and arrange the engine timing that the intake opening of said pair of cylinders connected to the same branch are spaced apart at least 270° of crankshaft rotation.

An object of our present invention is to improve the performance of engines of the aforesaid type by providing a fuel distributing device adapted for use therewith to insure an efficient and uniform distribution of the fuel to the engine cylinders.

Another object of our invention is to provide a compact intake manifold structure of the type employing a plurality of branches and associated port runners compactly arranged and constructed to provide a fuel distributing system of minimum cost and of simplified construction.

Figure 1:
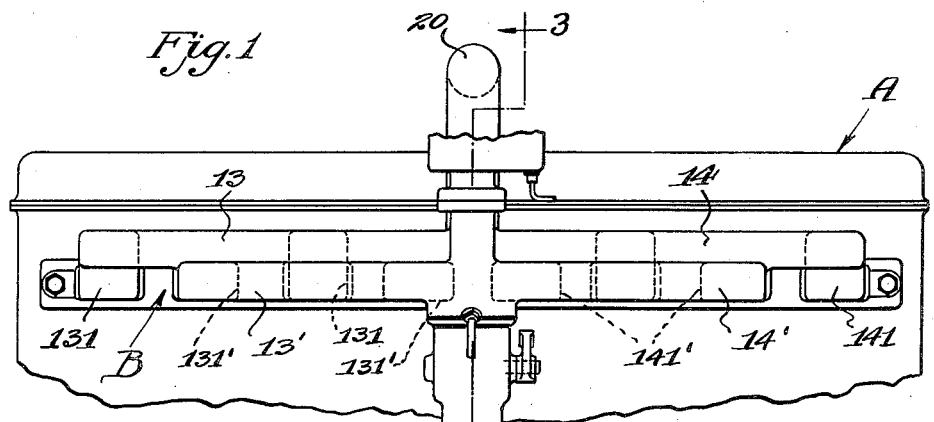
Figure 2:
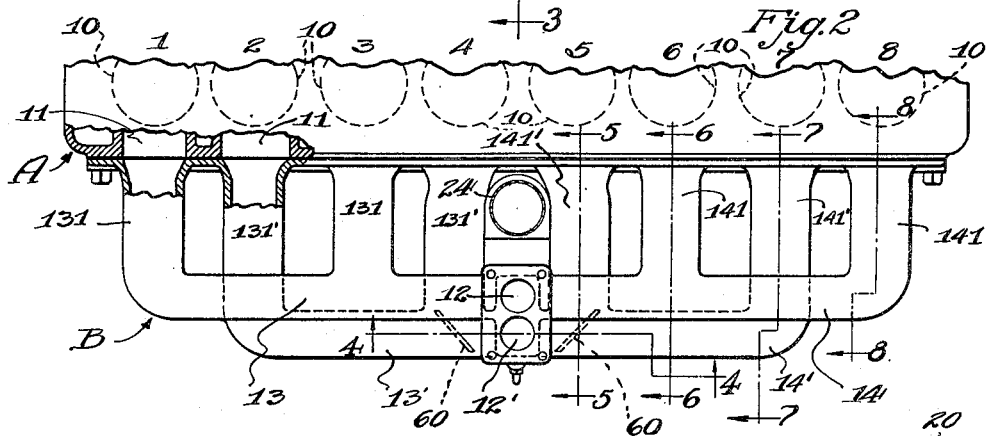
Figure 3:
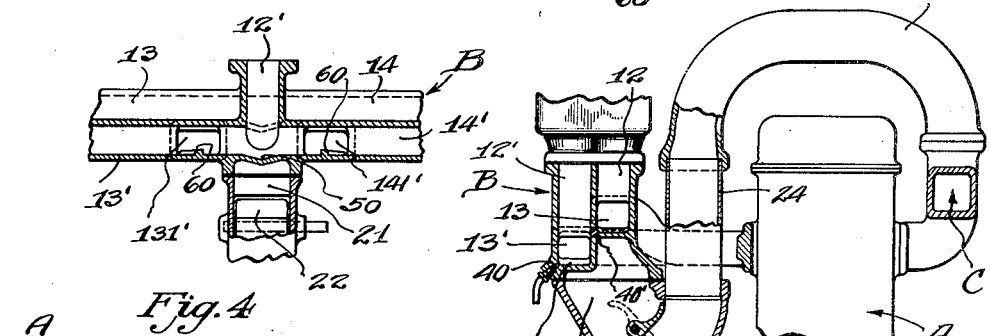
Figure 4:
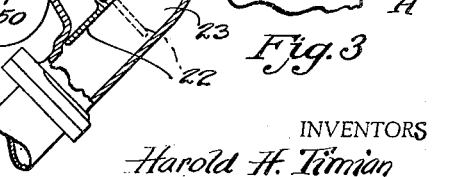
Figure 11:
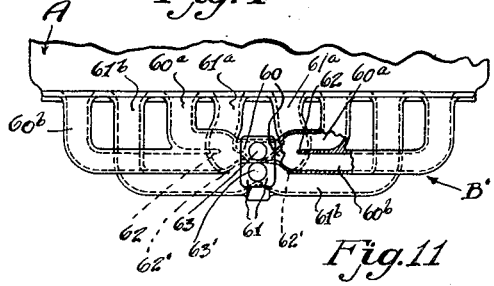

For a more detailed understanding of our invention, reference may be had to the accompanying drawings which illustrate one form which our invention may assume, and in which:

Fig. 1 is a fragmentary side elevational view of an internal combustion engine and illustrating an intake manifold associated therewith and constructed in accordance with our invention, Fig. 2 is a plan view of the manifold partly in section, Fig. 3 is a vertical sectional view taken substantially on the line 3—3 of Fig. 1, Fig. 4 is a vertical sectional view taken substantially on the line 4—4 of Fig. 2, Fig. 5 is a detail sectional view taken on the line 5—5 of Fig. 2, Fig. 6 is a detail sectional view taken on the line 6—6 of Fig. 2, Fig. 7 is a detail sectional view taken on the line 7—7 of Fig. 2, Fig. 8 is a detail sectional view taken on the line 8—8 of Fig. 2, Fig. 9 is a detail section of a modified construction, Fig. 10 is a diagrammatic view of an eight throw crankshaft, and Fig. 11 is a plan view partly in section of a modified construction.

The intake manifold structure illustrated in the accompanying drawings is especially adapted for assembly with an eight cylinder engine of the sleeve valve type and we have chosen to show our invention in connection with an engine of the aforesaid type merely for purposes of illustration as it will be readily apparent that the principles of our invention may be adapted for engines other than those of the sleeve valve type and for engines other than those of the eight cylinder type.

"A" designates a multi-cylinder engine preferably of the eight cylinder type having a plurality of aligned cylinders 10 respectively numbered 1 to 8 inclusive and each cylinder is preferably connected with an intake passage 11 opening through the side of the engine block.

A manifold structure B is adapted for assembly with the engine A and consists of dual risers or primary fuel mixture conducting portions 12 and 12', inner and outer branches or lateral runners 13, 13' and 14, 14' and associated port runners 131, 131' and 141, 141'. The lateral runners or branches 13, 13' and 14, 14' preferably extend substantially in opposite directions, the branches 13', 14' being arranged to extend substantially parallel with branches 13, 14 and branches 13, 14 are offset upwardly and inwardly of branches 13', 14' in such a manner as to overlie the port runners 131', 141' connecting the branches 13', 14' with the intake passages 10 of cylinders 2, 4, 5 and 7. Port runners 131, 141 connect the branches 13, 14 with the intake passages 10 of cylinders 1, 3, 6 and 8 and said port runners are preferably dipped downwardly and then extend inwardly toward the engine in substantially the same horizontal plane of port runners 131', 141'.

The engine crankshaft is so arranged and the engine timing is such as to provide an engine timing of 1—6—2—5—8—3—7—4— and it will be noted that the intake openings of each pair of cylinders connected to the same branch are spaced apart by at least 270° of the crankshaft rotation. Thus port runners 131 connect cylinders 1 and 3 to branch 13, port runners 141 connect cylinders 6 and 8 to branch 14, port runners 131' connect cylinders 2 and 4 to branch 13', and port runners 141' connect cylinders 5 and 7 to branch 14'.

It will be noted that the lateral runners 13, 13' and 14, 14' are substantially square in cross section while port runners 131, 131' and 141, 141' are rectangular in cross section with a greater width than height. It may be also noted that the floors of the associated lateral and port runners are substantially flush thereby forming a continuous floor portion. Further, the lateral runners 13', 14' and associated port runners 131', 141' lie substantially in a common horizontal plane in line with the intake passages 10. That portion of each port runner adjacent the lateral runner is preferably progressively reduced in height so as to gradually merge into the rectangular cross-section of the runner and it is noted that the cross-sectional area of each of said port runners is substantially the same as the cross-sectional area of each of said lateral runners.

In the engine illustrated an exhaust manifold C is assembled to that side of the engine opposite to the side carrying the intake manifold. A crossover pipe 20 is constructed to conduct the exhaust gases over the top of the engine into proximity of a hot spot or heating jacket carried by the intake manifold in the vicinity of the risers 12, 12'. Preferably, this heating jacket 21 is located centrally of the manifold as shown and a pivoted valve 22 is associated therewith for controlling the amount of exhaust gas deflected therein from the exhaust gas conducting portion 23 carried by said intake manifold. Said pipe 20 is connected with the conducting portion 23 by means of a sleeve 24 of relatively thin walls for restricting the flow of heat by conduction from the exhaust manifold to the intake manifold. Obviously, this sleeve 24 may be constructed of a material that is not a good heat conductor if so desired.

The manifold construction shown in Fig. 9 is provided with a single riser or primary fuel conducting portion 30 as contrasted with the double risers 12, 12' shown in Fig. 3. Thus the fuel mixture introduced downwardly into said lateral runners is uniformly divided. As plainly seen in Fig. 3, holes 40, 40' are drilled into said manifold to provide drainage holes for said manifold structure, the angular relation of these holes permitting same to be drilled in one operation. Preferably the manifold is constructed with a slight depression 50 adjacent the riser outlets and said drainage holes preferably communicate with these depressions.

The lateral runners 13', 14' are preferably provided with baffles 60 extending substantially across said runner and preferably sloping to control wet fuel distribution in said runners. These baffles are preferably located adjacent the junction of the intermediate port runners with the lateral runners and are inclined to the longitudinal axis of the lateral runner at approximately an angle of about 45°. In the particular engine for which this manifold was constructed baffles of this character proved to be adequate for controlling wet fuel distribution but it will be obvious that additional baffles may be employed if so desired and said baffles may vary in height and size or location depending on the particular engine construction or manifold construction with which said baffles are employed.

In Fig. 11 we have illustrated a slightly modified manifold construction B' which in general embodies the principles as illustrated in Figs. 1 to 9 inclusive. This particular construction provides oppositely extending lateral runners 60 and 61. The lateral runners 60 are preferably offset upwardly and inwardly of the lateral runners 61 generally similar to the construction of lateral runners 13, 13' and 14, 14' shown in Figs. 1 to 9. However, this modified construction departs from that shown in Figs. 1 to 9 in that the runners 60 and 61 are divided by fingers 62 and 62' respectively extending substantially axially of each runner but which terminate remote with respect to the risers 63 and 63', said fingers 62 dividing the runners 60 into port branches 60$^a$ and 60$^b$ and the fingers 62' dividing the runners 61 into port branches 61$^a$ and 61$^b$. The purpose of these fingers or splits is to more effectively distribute the wet fuel precipitate and to eliminate ramming in the longer port branches. It will be noted that the port branches 60$^a$ and 60$^b$ are offset laterally with respect to runners 60 and port branches 61$^a$ and 61$^b$ are offset laterally with respect to runners 61. The branches 61$^a$ and 61$^b$ are thus constructed to cross under the runners 60 and port branches 60$^b$ respectively in a manner as taught by the construction illustrated in Figs. 1 to 9 inclusive.

This manifold construction as herein described provides a simplified compact structure of economical manufacture and further it uniformly distributes the fuel and fuel mixture to the various engine cylinders in such a way as to provide for an improved engine performance.

For purposes of facilitating the more accurate description of these structures in the claims, the structure may be referred to as embodying a pair of fuel distributing portions each comprising a lateral runner and a plurality of port branches communicating therewith.

It will be apparent to those skilled in the art to which our invention pertains that various modifications and changes may be made therein without departing from the spirit of our invention or from the scope of the appended claims.

What we claim as our invention is:

1. An intake manifold structure for engines having a plurality of aligned intake ports and including lateral runners extending longitudinally of the engine, one of said lateral runners constructed to extend substantially in a horizontal plane containing the engine intake ports, the other of said lateral runners offset upwardly and inwardly toward the engine with respect to the first said lateral runner, and a plurality of port runners connecting each of said lateral runners with said engine intake ports.

2. An intake manifold structure for engines having a plurality of aligned intake ports and including lateral runners extending longitudinally of the engine, one of said lateral runners constructed to extend substantially in a horizontal plane containing the engine intake ports, the other of said lateral runners offset upwardly and inwardly toward the engine with respect to the first said lateral runner, and a plurality of port runners spaced longitudinally of the engine for connecting each of said lateral runners with said engine intake ports.

3. An intake manifold structure for engines having a plurality of aligned intake ports and including lateral runners extending longitudinally of the engine, one of said lateral runners constructed to extend substantially in a horizontal plane containing the engine intake ports, the other of said lateral runners offset upwardly and inwardly toward the engine with respect to the first said lateral runner, and a plurality of port runners connecting each of said lateral runners with said engine intake ports, said port runners spaced longitudinally of the lateral runners and extending substantially at right angles thereto.

4. An intake manifold structure for engines having a plurality of aligned intake ports and including lateral runners extending longitudinally of the engine, one of said lateral runners constructed to extend substantially in a horizontal plane containing the engine intake ports, the other of said lateral runners offset upwardly and inwardly toward the engine with respect to the first said lateral runner, and a plurality of port runners connecting each of said lateral runners with said engine intake ports, said port runners spaced longitudinally of the lateral runners and extending substantially at right angles thereto, the port runners associated with the upper lateral runner constructed to dip downwardly and terminating in outlets aligned in a common horizontal plane with the port runners associated with the other lateral runner.

5. An intake manifold structure for engines and including lateral runners constructed substantially square in cross section, and end and intermediate port runners communicating therewith for connecting said lateral runners with the engine, said intermediate port runners constructed rectangular in cross section and having a width greater than the height, the height and width of the intermediate port runners being respectively less and greater than the height and width of the lateral runners whereby to provide port runners each proportioned to have a cross-sectional area substantially the same as that of the lateral runner.

6. An intake manifold structure for engines and including lateral runners constructed substantially square in cross section, and end and intermediate port runners communicating therewith for connecting said lateral runners with the engine, said intermediate port runners constructed rectangular in cross section and having a width greater than the height, the height of said intermediate port runners being less than that of the lateral runners, said lateral and associated intermediate port runners having substantially continuous floor portions, the cross sectional area of each of said port runners being substantially equal to that of the lateral runner.

7. An intake manifold structure for engines and including lateral runners extending longitudinally of the engine, and port runners communicating with said lateral runners, one of said lateral runners offset upwardly and to one side of the other lateral runner and arranged to overlie the port runners associated with said other lateral runner, port runners associated with one of said lateral runners constructed to extend intermediate a pair of adjacent port runners associated with said other lateral runner and positioned in substantially a common horizontal plane.

8. An intake manifold structure for a multicylinder engine including lateral runners extending longitudinally of the engine, one of said runners offset upwardly and inwardly toward the engine with respect to said other runner, said lateral runners each provided with a finger extending substantially in the vertical longitudinal axial plane of the runner for dividing same into branches, said branches adjacent the associated finger being laterally offset with respect to the associated lateral runner, and port runners communicating with each of said branches.

9. An intake manifold structure for a multicylinder engine including a pair of fuel distributing portions each comprising a lateral runner extending longitudinally of the engine and terminating in a plurality of branches offset laterally with respect to lateral runner and extending longitudinally of the engine, the lateral runner of one fuel distributing portion offset upwardly and inwardly toward the engine with respect to the lateral runner of said other fuel distributing portion, and port runners each communicating with one of said branches.

10. An intake manifold structure for a multicylinder engine including a pair of fuel distributing portions each comprising a lateral runner extending longitudinally of the engine and terminating in a plurality of branches offset laterally with respect to lateral runner and extending longitudinally of the engine, the lateral runner of one fuel distributing portion offset upwardly and inwardly toward the engine with respect to the lateral runner of said other fuel distributing portion, said branches terminating in port runners having outlets constructed to lie substantially in a common horizontal plane.

11. An intake manifold structure for a multicylinder engine including a pair of fuel distributing portions each comprising a lateral runner extending longitudinally of the engine and terminating in a plurality of branches offset laterally with respect to lateral runner and extending longitudinally of the engine, the lateral runner of one fuel distributing portion offset upwardly and inwardly toward the engine with respect to the lateral runner of said other fuel distributing portion, and port runners communicating with the branches of one fuel distributing portion constructed to cross under a portion of said other fuel distributing portion.

12. An intake manifold structure for a multicylinder engine including a pair of fuel distributing portions each comprising a lateral runner and a plurality of branches communicating therewith said lateral runner and branches extending longitudinally of the engine, a split adjacent the junction of said lateral runner and branches for dividing the fuel flow, said branches laterally offset with respect to said associated lateral runner, the lateral runner of one fuel distributing portion offset upwardly and inwardly toward the engine with respect to the lateral runner of said other fuel distributing portion, and port runners connected with said branches, the branches of one of said fuel distributing portions constructed to overlie the port runners connected with the branches of said other fuel distributing portion.

13. An intake manifold structure for engines and including lateral runners, one of said lateral runners offset upwardly and to one side of the other lateral runner, port runners connecting said lateral runners with the engine, said structure including a wet fuel drain opening connecting said lateral runners.

14. An intake manifold structure for engines and including lateral runners, one of said lateral runners offset upwardly and to one side of the other lateral runner, port runners connecting said lateral runners with the engine, said structure including an opening for draining the wet fuel precipitate from the floor of the upper lateral runner into said lower lateral runner, and means for draining the wet fuel accumulations from said lower lateral runner.

15. An intake manifold structure for engines and including lateral runners, one of said lateral runners offset upwardly and to one side of the other lateral runner, port runners connecting said lateral runners with the engine, said structure including an opening for draining the wet fuel precipitate from the floor of the upper lateral runner into said lower lateral runner, said lower lateral runner having a depression in the floor thereof for collecting said wet fuel precipitate, and means for draining the wet fuel accumulations from the depression in said lower lateral runner.

16. An intake manifold structure for engines and including lateral runners, one of said lateral runners offset upwardly and to one side of the other lateral runner, port runners connecting said lateral runners with the engine, and wet fuel draining means connecting the adjacent corners of said lateral runners.

LEWIS P. KALB.
HAROLD H. TIMIAN.